United States Patent
Love

(10) Patent No.: US 6,196,253 B1
(45) Date of Patent: Mar. 6, 2001

(54) CONTINUOUSLY OPERATED CONDENSATE DRAIN VALVE

(76) Inventor: H. Worth Love, 2501 Howerton Ct., Charlotte, NC (US) 28270

(*) Notice: Subject to any disclaimer, the term of this patent is extended or adjusted under 35 U.S.C. 154(b) by 0 days.

(21) Appl. No.: 09/075,631

(22) Filed: May 11, 1998

(51) Int. Cl.[7] .................................................. G05D 9/12
(52) U.S. Cl. ........................................ 137/187; 137/204
(58) Field of Search ................................. 137/187, 204

(56) References Cited

U.S. PATENT DOCUMENTS

| | | | |
|---|---|---|---|
| 2,564,873 | * 8/1951 | Wright | 137/187 |
| 4,261,382 | 4/1981 | Bridges | 137/187 |
| 4,308,889 | 1/1982 | Lin et al. | 137/187 |
| 4,336,821 | 6/1982 | Frantz et al. | 137/187 |
| 4,505,427 | 3/1985 | Bridges | 236/54 |
| 4,974,626 | 12/1990 | Koch | 137/187 |
| 5,337,779 | 8/1994 | Fukuhara | 137/187 |
| 5,531,241 | 7/1996 | Rasmussen | 137/188 |

* cited by examiner

Primary Examiner—Gerald A. Michalsky
(74) Attorney, Agent, or Firm—Dougherty & Clements LLP

(57) ABSTRACT

The invention is a continuously operated condensate drain valve operating in real-time response to the presence of an electrically conductive media in the interior chamber of the condensate drain valve. The invented valve includes a valve body, a subminiature sensor embedded in the valve body and an electric control circuit electrically connected to the sensor. Because the sensor is located in the valve body and because the control circuit does not include a delay means, the invented valve can operate at an extremely high cycle rate thereby keeping the air compression system virtually condensate free. Consequently, the invented valve enables an air compressor to maintain optimal capacity and to operate at an unprecedented level of efficiency.

10 Claims, 5 Drawing Sheets

Fig.3
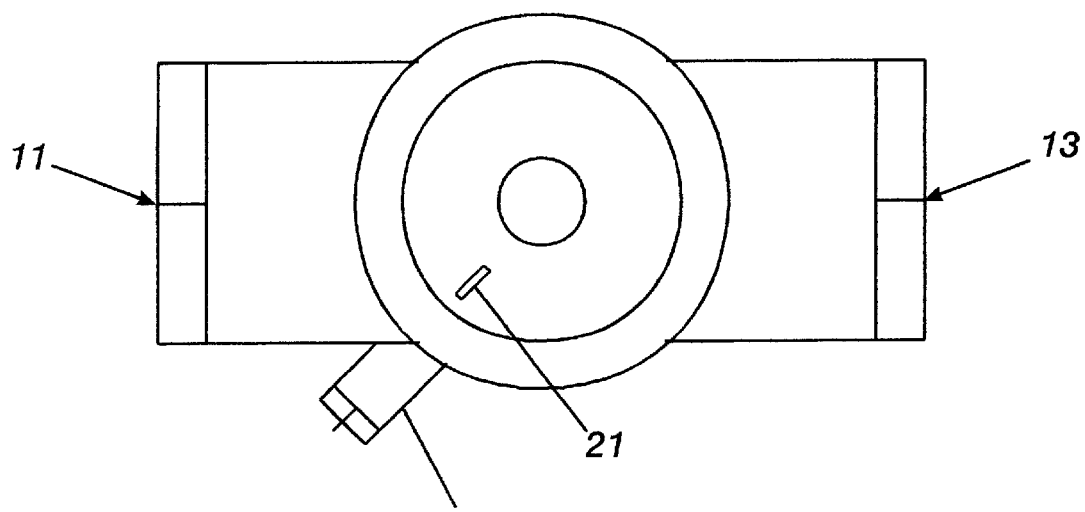
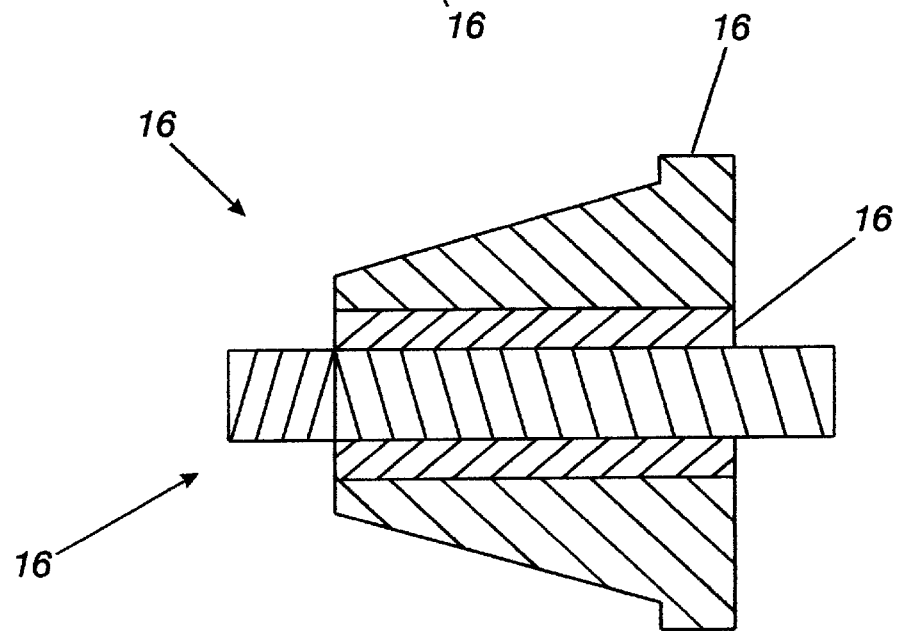
Fig.4

CONTINUOUSLY OPERATED CONDENSATE DRAIN VALVE

FIELD OF THE INVENTION

The present invention relates to condensate drain valves used in conjunction with apparatus for compressing air. More particularly, the invention relates to a condensate drain valve operating in response to the presence of electrically conductive media in the interior chamber of the condensate drain valve. The present invention also relates to a method for efficiently discharging condensate through a condensate drain valve.

BACKGROUND

Compressed air is a valuable energy source. When air is compressed, the moisture content of the air is released as water vapor which forms condensate. Condensate is an unwanted byproduct of air compression. Condensate occupies a portion of the volume of an air compression chamber thereby decreasing the working volume of the chamber. The more space the condensate occupies in the air compression chamber, the lower the capacity of the air compressor. Maintaining condensate at minimal levels increases the efficiency of the air compression operation.

Fluid transfer systems utilized in conjunction with air compressors are well known for removing condensate from the air compression chamber. One component of a fluid transfer system is a condensate drain valve. Condensate drain valves enable accumulated condensate to be periodically discharged from the air compression chamber. Although known condensate drain valves are suitable for this purpose, none of the known condensate drain valves efficiently handle the task.

Initially, condensate drain valves were manually operated. Recently, numerous attempts have been made to automate the operation of condensate drain valves. One type of known condensate drain valve utilizes a mechanical float system to trigger the opening of the condensate drain valve. The mechanical float system has a ball positioned in a seat. The ball has a lower density than does the condensate. Consequently, when condensate enters the interior chamber of the valve, the float rises and the condensate escapes through an orifice below the seat. After the condensate escapes, the float returns to its initial position on the seat. Known condensate drain valves that utilize mechanical float systems have numerous disadvantages. Typically, slug and scale alter the surface of the seat. This results in gas leakage when no condensate is present. Energy losses from using such condensate drain valves can range from a few hundred to several thousand dollars per year.

Another known type of condensate drain valve is equipped with a timer. The timer utilizes a power relay which causes an electrically operated condensate drain valve to activate. The timer is set, by a trial and error approach, to periodically open the valve. The condensate is forced out through the valve by the force of the compressed air. The timer keeps the valve open for a fixed amount of time and then causes the valve to close. Because the timer does not precisely correspond to the presence of condensate, the valve will often be open for either too little or too much time. It is estimated that a properly installed timed condensate drain valve loses approximately $1,900 per year. As these valves are often not properly installed, the average valve actually loses much more money.

Another known type of condensate drain valve uses an external vessel to collect condensate formed in the air compression chamber. Sensors, typically reed switches, sense the presence of condensate. When condensate is detected, the sensor causes the valve to open. After the condensate is removed, the sensor causes the valve to close. This type of condensate drain valve is complex and very expensive to manufacture. Frequently, the savings from more efficient air compression are exceeded by the high cost of using this type of condensate drain valve.

Solenoid operated valves are also well known. Solenoid operated valves include an electromagnetic coil assembled over a tube mounted to the body of the valve. An armature is positioned inside the tube and is used to start, stop or divert the flow of liquid or gaseous media. The armature has a spring and a spring loaded sealing disc. In operation, the sealing disc is moved against the force of the spring when the electromagnetic coil is energized thereby opening the valve. Various types of solenoid operated valves using this basic structure are known including: direct acting solenoid valves; pilot operated solenoid valves; and pilot operated with assisted lifting valves.

One known type of solenoid operated condensate drain valve is disclosed in U.S. Pat. No. 4,261,382 to Bridges ("the '382 patent"). The solenoid operated condensate drain valve includes an electrical sensing probe inserted in a condensate drain line upstream of the valve so as to be electrically insulated from the drain line. While electrical isolation is necessary for the solenoid operated condensate drain valve to operate properly, this placement of the probe permits condensate to build-up to unnecessarily high levels thereby reducing the efficiency of the air compressor.

As disclosed in the '382 patent, the electrical sensing probe is connected by electrical leads to an electronic circuit. The electric circuit has voltage supply leads and is connected by electrical leads to the solenoid of the valve. In operation, when the probe does not sense the presence of condensate, the electronic circuit receives the oscillating signal rather than the steady positive output from the probe. When the electric circuit receives the oscillating signal, a timing cycle is initiated during which the solenoid is de-energized and the valve is closed. Although the disclosed electric circuitry performs the intended task, it is overly complex as evidenced by the requirement that the sensor be electrically isolated from the drain line.

The solenoid operated condensate drain valve disclosed in the '382 patent also includes a delay means for providing a desired minimum period between successive operations of the valve such that the valve remains closed for a pre-set period of time.

Because the condensate drain valve does not react to the presence of condensate in the interior chamber of the valve body, excessive condensate necessarily accumulates in the interior chamber of the valve body. Consequently, the efficiency of the air compressor is reduced.

Because of the limitations of known condensate drain valves, a need exists for a valve that can continuously minimize the amount of condensate present in the fluid transfer system of an air compressor.

While there are numerous methods and means for discharging condensate from an air compressor, none are known to be similar to, or to function in the manner of, the present invention.

SUMMARY OF THE INVENTION

The present invention is a solenoid operated condensate drain valve operating in real-time response to the presence of an electrically conductive media in the interior chamber of the condensate drain valve. The invented valve includes a valve body forming an interior chamber, a sensor embedded in the valve body and extending into the interior chamber and an electric control circuit electrically connected to the sensor. The sensor is preferably a subminiature sensor which is sufficiently small to allow the sensor to be embedded in the valve body. Because the sensor is located in the valve chamber and because the control circuit does not include a delay means, the invented valve can continuously discharge condensate before it accumulates excessively. Consequently, the invented valve enables an air compressor to maintain optimal capacity and to operate at an unprecedented level of efficiency.

Preferably, the condensate drain valve includes a two-way (on-off) solenoid valve having an input port and an output port for a liquid, gas or combination of both liquid and gas type medium to flow through. The control circuit is an open electrical circuit that uses condensate to close or complete the control circuit. When no condensate is present in the interior chamber, the control circuit is open and the condensate drain valve is in a closed position. When condensate is present in the interior chamber, the control circuit is closed and an electrical relay is activated which causes the solenoid to become energized. Consequently, the condensate drain valve is opened thereby allowing condensate to be discharged through the output port of the valve.

The subminiature sensor includes a tubular housing containing a pair of electrodes that are both insulated by glass. The tubular housing has a diameter of about $1/16$ inch and is made of a corrosion resistant material that is electrically conductive and is preferably made of 430 stainless steel. A first electrode is in electrical contact with the tube and a second electrode is exposed to the environment.

The sensor is embedded within the valve body in such a manner that the face of the sensor is positioned away from the flow of gas and/or liquid medium, for example, in the direction of the output port of the valve. As a result, the electrodes are protected by the sensor housing from damage due to the force of the flow of liquid, cavitation of the passing liquid, and blockage from particulates in the liquid.

The control circuit is electrically connected to the sensor embedded in the body of the condensate drain valve. The control circuit transmits an electrical signal that travels through one of the electrodes of the sensor. Preferably, the control circuit is housed in an enclosure or controller housing that is removably attached to the solenoid valve body. An electrical port provides a means for connecting a power supply to the control circuit. While the power supply requirements of the invented drain valve vary depending upon the control circuits being powered, a 12 volt AC, 1.5 mA power supply is exemplary.

Because the control circuit does not specifically incorporate delay means, the invented drain valve will have an extremely high cycle rate. Consequently, condensate will always be immediately drained from the interior chamber and the air compression system will operate at near optimal efficiency.

The controller may include a power indicator diode, a test button and a valve open indicator diode to improve the performance of the invented drain valve.

During operation of the air compressor, condensate will enter the interior chamber of the condensate drain valve. The control circuit remains open until an electrically conductive media, such as condensate, comes into simultaneous contact with the valve body, which is in electrical contact with the first electrode, and the second electrode. Because condensate has a greater degree of conductivity than air, the electrical signal bridges the gap between the first electrode and the second electrode thereby closing the control circuit. As a result, the closed control circuit causes the solenoid to energize thereby opening the condensate drain valve and allowing the condensate to be discharged. The condensate drain valve remains open as long as the control circuit is closed.

When only air is present between the sensor, the electrical signal does not pass from the first electrode to the second electrode because air does not have sufficient conductivity to permit the electrical signal to pass from the first electrode to the second electrode. Consequently, the control circuit is open, and the valve is in the closed position.

After the condensate has been discharged, the control circuit again opens which causes the solenoid to de-energize thereby returning the valve to the closed position. After the control circuit opens, it is immediately ready to close again when the circuit is again closed by condensate causing the electrodes to become electrically connected.

In an alternative embodiment of the present invention, the condensate drain valve detects and drains different types of media having different conductivities. The electric control circuit includes a resistance comparator circuit for detecting the conductivity of the different types of media. The resistance comparator circuit is electrically coupled to the sensor and is adjustable to correspond to different types of media having different conductivities.

Also disclosed is a method for efficiently operating a solenoid operated condensate drain valve that minimizes the level of condensate in the fluid transfer system of an air compressor. The invented method includes the step of detecting the presence of an electrically conductive media, particularly condensate, in the interior chamber with a subminiature sensor mounted in the valve body. Preferably, the sensor detects the presence of condensate by passing an electrical signal between a first electrode, or the valve body which is in electrical contact with the first electrode, and the second electrode which is electrically isolated from the first electrode and valve body. The invented method also includes the step of closing the control circuit, of which the sensor is a part, when the condensate is detected. The invented method further includes the step of energizing the solenoid of the drain valve by activating a relay switch to energize the solenoid, when the control circuit is closed. Finally, the invented method includes the step of opening the valve and discharging the condensate when the solenoid is energized.

The invented method also preferably includes closing the valve when condensate is no longer detected by the sensor. Thus, when the signal no longer passes between the first electrode, or the valve body which is in electrical contact with the first electrode, and the second electrode which is electrically isolated from the first electrode and valve body, the control circuit is opened. When the control circuit is opened, the relay switch is no longer activated and the solenoid of the valve is de-energized thereby closing the valve.

OBJECTS OF THE INVENTION

Accordingly, one of the objects of the present invention is to provide a condensate drain valve that is continually responsive to the presence of condensate in the interior chamber of the condensate drain valve.

A further, and more particular, object of the invention is to provide a solenoid operated condensate drain valve that permits the discharge of condensate when an electrically conductive media is present in the interior chamber of the condensate drain valve.

A further, and more particular, object of the invention is to provide a solenoid operated condensate drain valve that discharges condensate when an electrically conductive media is present in the interior chamber of the condensate drain valve and that is simple and economical to manufacture.

Another object of the invention is to provide a condensate drain valve that maintains the optimal capacity of an air compressor.

It is a further object of the present invention to provide a method for operating a condensate drain valve in a manner that minimizes the level of condensate in the fluid transfer system of an air compressor.

BRIEF DESCRIPTION OF THE DRAWINGS

The foregoing and other objects will become more readily apparent by referring to the following detailed description and the appended drawings in which:

FIG. 3 is a top view of the condensate drain valve taken along line 3—3 of FIG. 1;

FIG. 4 is a cross-sectional side view of a sensor according to the present invention.

DETAILED DESCRIPTION

Figure 1:
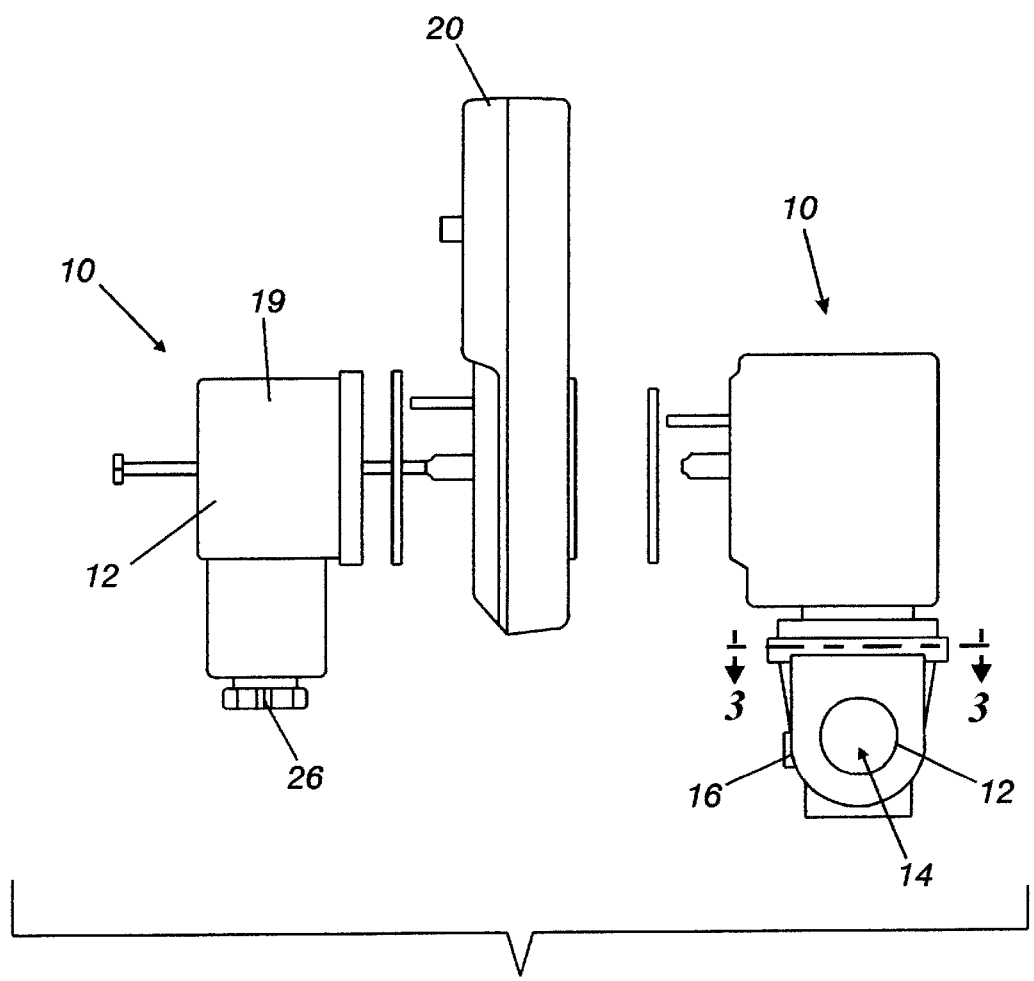
FIG. 1 is a side view of a preferred embodiment of a controller housing and a solenoid operated condensate drain valve according to the present invention.
Figure 2:
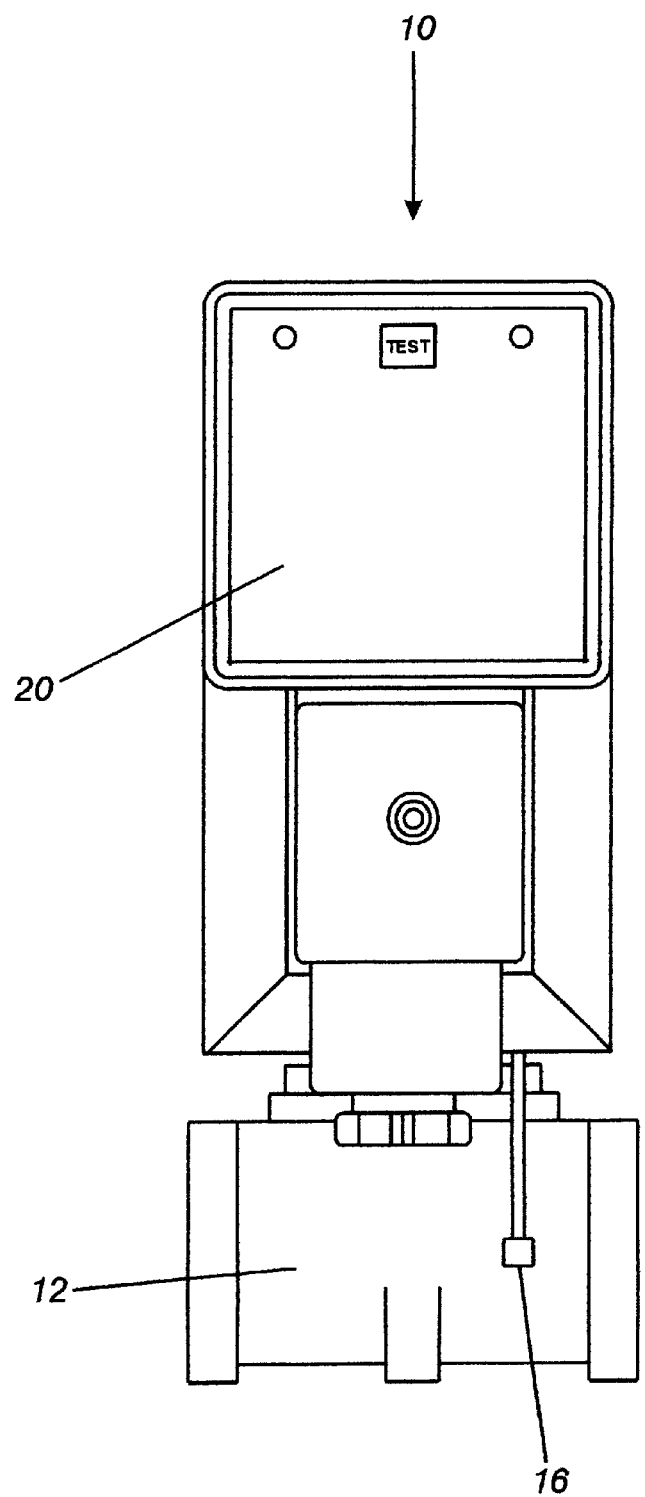
FIG. 2 is a front view of the condensate drain valve of FIG. 1.

Referring now to the drawings, and particularly to FIG. 1, the invented apparatus is a solenoid operated condensate drain valve, shown generally at 10, for efficiently discharging condensate from the fluid transfer system of an air compressor. FIG. 2 is a front view of the continuously operated condensate drain valve 10 of FIG. 1. In a preferred embodiment, the invented drain valve 10 includes a hollow valve body 12 that forms an interior chamber 14, a sensor 16 embedded in the valve body 12 and an electric control circuit, shown generally at 18 (FIG. 5), electrically connected to the sensor 16 and the drain valve 10. The sensor 16 includes a pair of electrodes for detecting a presence or accumulation of condensate in the drain valve 10. The control circuit 18 provides an electrical signal to the sensor 16 to determine the presence of condensate in the drain valve 10 and activates the drain valve when the presence of condensate is detected. The invented drain valve 10 opens in real time response to the presence of condensate in the valve body 12, and preferably opens instantaneously in response to a detected presence of condensate the interior chamber 14 of the valve body 12.

FIG. 3 is a top view of the condensate drain valve taken along line 3—3 of FIG. 1. The valve body 12 includes an input port 11 for receiving a flow of liquid and/or gas media and an output port 13 for conducting the liquid and/or gas media liquid away from the valve body 12. The valve body 12 contains a conventional solenoid operated valve 29 (FIGS. 5 and 6) having a solenoid coil 22 (FIGS. 5 and 6) and a relay contact 24 electrically coupled to the solenoid coil 22. When the solenoid coil 22 is energized, the valve 29 is closed, and when the solenoid coil 22 is not energized or de-energized, the valve 29 is opened.

FIG. 4 is a cross-sectional side view of the sensor 16. The sensor 16 extends through the valve body 12 and into the interior chamber 14 while substantially maintaining the structural integrity of the valve body 12 and maintaining a gas-tight and liquid-tight interface with the valve body 12. In a preferred embodiment of the present invention, the face of the sensor 16 is positioned in the valve body 12 in the general direction of the output port of the drain valve 12. The sensor 16 is preferably a subminiature sensor and includes a pair of electrodes electrically connected to the control circuit 18, a generally cylindrical enclosure 15 for housing the pair of electrodes and an electrical insulation 17 encompassing the pair of electrodes within the tubular enclosure 15.

One of the electrodes, or a first electrode (not shown), is electrically connected to the cylindrical enclosure 15, for example by conventional soldering or welding techniques, so that electrical signals or current are conducted between the electrode and the valve body 12. The other electrode 21, or a second electrode, is electrically insulated from the valve body 12 by the electrical insulation 17 and is preferably proximally positioned along the longitudinal axis defined by the cylindrical enclosure 15. The cylindrical enclosure 15 is made of an electrically conductive material and is preferably made of 430 stainless steel. The electrical insulation 17 is preferably made of glass, but may also be made of electrically insulating ceramic material. The generally cylindrical enclosure 15 has a diameter that is smaller than ⅛ inch and preferably about 1/16 inch. The subminiature size of the sensor 16 allows the sensor 16 to be embedded in the valve body 12, whereas non-subminiature sized sensors are too large.

Figure 5:
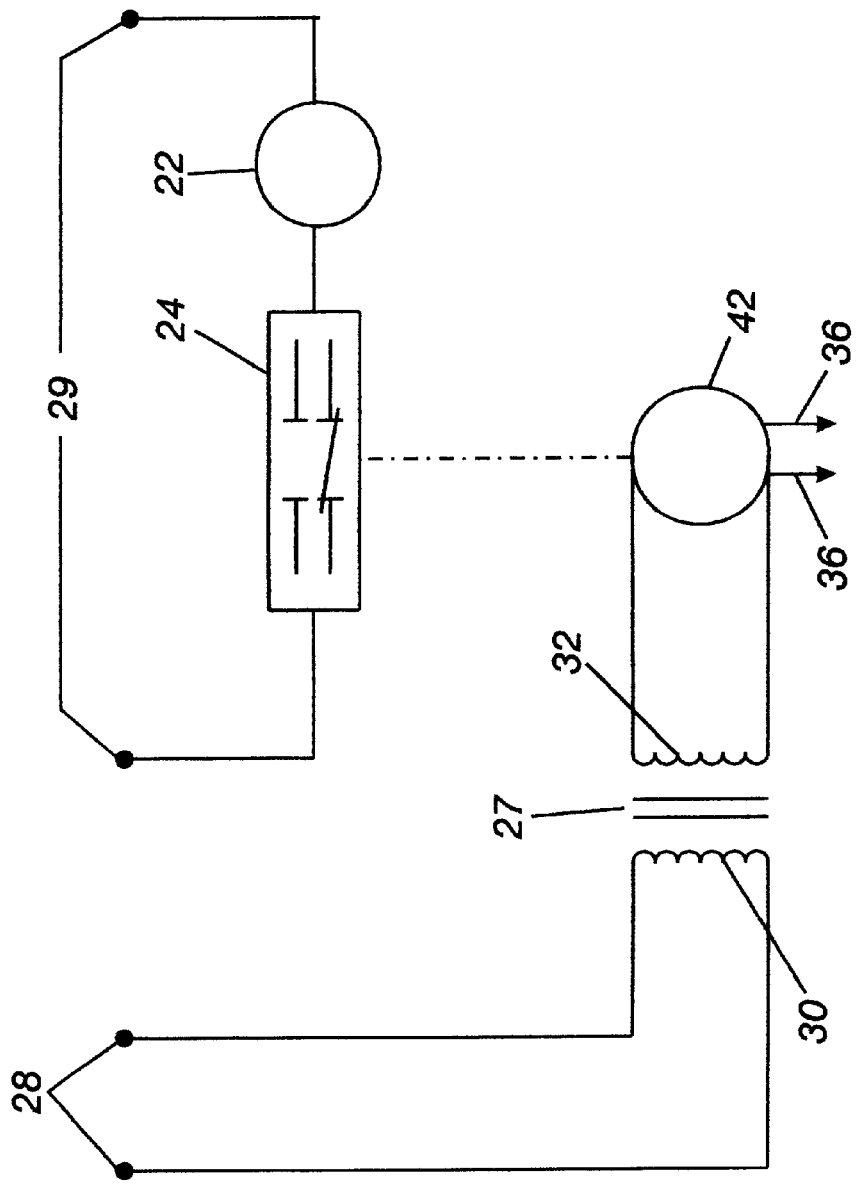
FIG. 5 is a diagram of an electric circuit that can be incorporated in the condensate drain valve of FIG. 1.

FIG. 5 is a diagram of the electric control circuit 18. The control circuit 18 includes a relay coil 42 that is coupled to the sensor 16 and is housed in a controller enclosure 20 (FIGS. 1 and 2) that is removably attached to the valve body 12. The relay coil 42 is electrically connected to the sensor 16 by a pair of electrical leads 36. The sensor 16 is electrically connected to the control circuit 18, as previously mentioned, to form an open electrical circuit. In a preferred embodiment, the control circuit 18 transmits an electrical signal that travels along one of the electrodes, for example, the electrical signal is transmitted by the control circuit 18 along the first electrode. When an electrically conductive media contacts the sensor 16, current is provided to the relay coil 42 which closes the relay contact 24. The relay coil 42 and the relay contact 24 of the solenoid operated valve together form a relay switch 42, 24 for energizing/de-energizing the solenoid coil 22. When the relay contact 24 is closed, the solenoid 22 energizes and the drain valve 10 opens.

The control circuit 18 is electrically coupled to a power converter, shown generally at 27, to provide the control circuit 18 with a pre-determined amount of electrical current and potential. The primary transformer 30 and the secondary transformer 32 convert the power input from the power supply 28 to a power level that is suitable for energizing the solenoid 22. A port 26 (FIG. 1) is positioned on the controller enclosure 20 (FIG. 1) for connecting a conventional power supply 28 to the control circuit 18. The power converter 27 includes a primary transformer 30 electrically coupled to the port 26 and a secondary transformer 32 electrically coupled to the primary transformer 30. While the power supply requirements of the invented drain valve 10 vary depending upon the control circuits being powered, a 12 volt AC, 1.5 mA power supply is exemplary.

In operation, when an electrically conductive media, such as condensate, is present in the interior chamber 14 of the valve body 12, the electric signal passes from one of the electrodes to the other electrode through the electrically conductive media, and the control circuit 18 is thereby closed. When the control circuit 18 is closed, the relay switch 24, 42 is activated thereby instantaneously energizing the solenoid 22. As a result, the valve 29 is opened and the electrically conductive media is discharged. When the electrically conductive media is no longer present in the interior chamber 14 of the valve body 12 so that the signal can no longer pass from one electrode to the other electrode, the control circuit 18 is thereby opened. As a result, the relay switch 24, 42 de-activates causing the solenoid 22 to de-energize and close the valve 29.

Thus configured, the invented valve 10 minimizes the amount of condensate present in the fluid transfer system attached to an air compressor by instantaneously removing the condensate once it begins to accumulate in the interior chamber 14 of the valve body 12. The invented valve 10 is opened and closed in a real time response to the presence of condensate within the valve body 12. No delay is incorporated in the operation of the invented drain valve 10.

Figure 6:
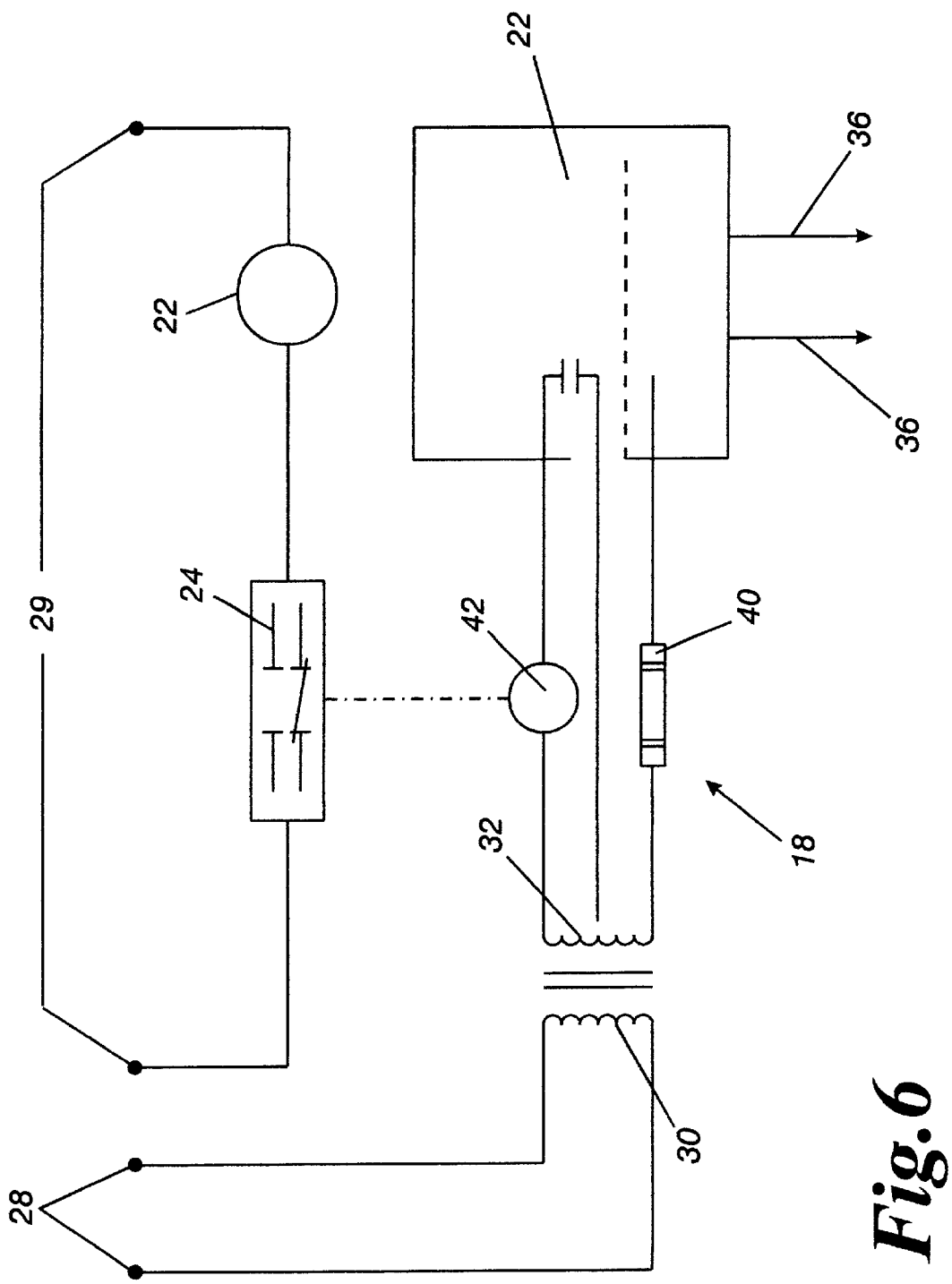
FIG. 6 is a diagram of an alternative embodiment of the electric circuit of FIG. 5 that can be incorporated in the condensate drain valve of FIG. 1.

FIG. 6 is an exemplary control circuit of an alternative embodiment of the present invention. The control circuit, indicated generally as 18, includes an electrical power supply 28 for providing an electrical potential or power input to the circuit 18. The primary transformer 30 and the secondary transformer 32 convert the power input from the power supply 28 to a power level that is suitable for energizing the solenoid 22. The control circuit 18 also includes a resistance comparator circuit 34 for determining the conductivity of different electrically conductive media. The comparator circuit 34 is electrically connected to the sensor 16 by the electrical leads 36. A resistance setpoint 40 and the relay coil 42 complete the control circuit 18. The resistance setpoint 40 is adjustable to match a predetermined conductivity that is desired to be detected by the sensor 16. The relay coil 42 is coupled to the relay contact 24 to form the relay switch 24, 42. When an electrically conductive media contacts the sensor 16, current is provided to the relay coil 42 which closes the relay switch 24, 42. When the relay switch 24, 42 is closed, the solenoid 22 energizes and the drain valve 10 is opened.

In one embodiment of the present invention, the primary transformer 30 and secondary transformer 32 are housed in a power supply enclosure 19 that is removably attachable to the controller enclosure 20. The port 26 is positioned on the power supply enclosure 19 for connecting the conventional power supply 28 to the control circuit 18. The controller enclosure 20 houses the control circuit 18 and is removably attachable to the valve body 12. Accordingly, the power supply enclosure 19, the controller enclosure 20 and the valve body 12 are removable from one another to facilitate replacement of a defective component.

SUMMARY OF THE ACHIEVEMENT OF THE OBJECTS OF THE INVENTION

From the foregoing, it is readily apparent that I have invented a solenoid operated condensate drain valve that maintains the optimal capacity of an air compressor because it is continually responsive electrically conductive media in the interior chamber of the valve body. The invented condensate drain valve causes condensate to be discharged when an electrically conductive media, such as condensate, is present in the interior chamber of the condensate drain valve. The present invention provides a solenoid operated condensate drain valve that discharges condensate when an electrically conductive media is present in the interior chamber of the condensate drain valve and that is simple and economical to manufacture. I have also invented a method for efficiently operating a condensate drain valve that minimizes the level of condensate in the fluid transfer system of an air compressor.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A condensate drain valve for continuously discharging an electrically conductive media, comprising:

a generally hollow valve body defining an interior chamber having an input port and an output port;

a solenoid attached to said valve body and operable between a valve open position when energized and a valve closed position when de-energized;

a subminiature sensor embedded in said valve body for detecting the presence of electrically conductive media in said interior chamber;

an electric control circuit electrically connected to said sensor and to said solenoid for operating said solenoid in real-time;

a controller enclosure removably attached to said valve body for housing said control circuit; and a power converter electrically coupled to said control circuit.

2. The condensate drain valve of claim 1 wherein said sensor extends into the interior chamber of the valve body and is directed toward the output port.

3. The condensate drain valve of claim 1 wherein said control circuit further comprises a relay switch connecting said control circuit to said solenoid and wherein said relay switch is adapted to instantaneously energize the solenoid when said control circuit is closed.

4. The condensate drain valve of claim 1 wherein said power converter comprises:

a port for connecting an electrical power supply to power said control circuit;

a primary transformer electrically coupled to said port; and a secondary transformer electrically coupled to said primary transformer.

5. The condensate drain valve of claim 1 wherein electrically conductive media is condensate.

6. The condensate drain valve of claim 1 wherein said subminiature sensor comprises:

a pair of electrodes electrically connected to said control circuit;

a corrosion resistant tubular enclosure for housing said pair of electrodes and said insulation; and an electrical insulation encompassing said pair of electrodes within said tubular enclosure.

7. The condensate drain valve of claim 6 wherein said pair of electrodes comprises:

a first electrode electrically connected to said valve body; and a second electrode electrically insulated from said valve body.

8. The condensate drain valve of claim 6 wherein said electrical insulation is made of glass.

9. The condensate drain valve of claim 6 wherein said tubular enclosure has a diameter of about 1/16 inch.

10. The condensate drain valve of claim 1 wherein said control circuit further comprises a resistance comparator circuit for detecting the presence of electrically conductive media by measuring conductivity.

* * * * *